US009043777B2

(12) United States Patent
Guo et al.

(10) Patent No.: US 9,043,777 B2
(45) Date of Patent: *May 26, 2015

(54) TRANSFERRING FILES TO A BASEBOARD MANAGEMENT CONTROLLER ('BMC') IN A COMPUTING SYSTEM

(71) Applicant: INTERNATIONAL BUSINESS MACHINES CORPORATION, Armonk, NY (US)

(72) Inventors: Kai Jie Guo, Shanghai (CN); Edward J. Klodnicki, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 58 days.

This patent is subject to a terminal disclaimer.

(21) Appl. No.: 13/708,245

(22) Filed: Dec. 7, 2012

(65) Prior Publication Data

US 2014/0122852 A1 May 1, 2014

Related U.S. Application Data

(63) Continuation of application No. 13/665,132, filed on Oct. 31, 2012.

(51) Int. Cl.
G06F 9/44 (2006.01)
G06F 9/00 (2006.01)
G06F 9/445 (2006.01)

(52) U.S. Cl.
CPC ...... *G06F 9/00* (2013.01); *G06F 8/65* (2013.01)

(58) Field of Classification Search
None
See application file for complete search history.

(56) References Cited

U.S. PATENT DOCUMENTS

| 7,660,937 | B2 | 2/2010 | Frantz et al. | |
| 8,688,889 | B2 * | 4/2014 | Bauchot et al. | 710/316 |
| 2005/0229173 | A1 | 10/2005 | Mihm et al. | |
| 2007/0186086 | A1 | 8/2007 | Lambert et al. | |
| 2009/0144469 | A1 * | 6/2009 | Brundridge et al. | 710/74 |
| 2009/0210456 | A1 * | 8/2009 | Subramaniam | 707/202 |
| 2011/0153901 | A1 * | 6/2011 | Bauchot et al. | 710/313 |
| 2012/0042307 | A1 | 2/2012 | Shao | |
| 2012/0084552 | A1 * | 4/2012 | Sakthikumar et al. | 713/100 |
| 2012/0324188 | A1 * | 12/2012 | Bauchot et al. | 711/162 |
| 2013/0254759 | A1 * | 9/2013 | Xu et al. | 717/174 |

FOREIGN PATENT DOCUMENTS

TW 200832223 A 8/2008

OTHER PUBLICATIONS

Brey et al. "BladeCenter Chassis Management", IBM Journal of Research & Development, Nov. 2005, pp. 941-961, vol. 49, No. 6, International Business Machines Corporation, USA.

* cited by examiner

*Primary Examiner* — Philip Wang
(74) *Attorney, Agent, or Firm* — Edward J. Lenart; Katherine S. Brown; Kennedy Lenart Spraggins LLP

(57) ABSTRACT

Transferring files to a baseboard management controller ('BMC') in a computing system, including: receiving, by the BMC, a request to initiate an update of the computing system; identifying, by the BMC, an area in memory within the computing system for storing an update file; and transmitting, by the BMC, a request to register the BMC as a virtual memory device.

5 Claims, 4 Drawing Sheets

TRANSFERRING FILES TO A BASEBOARD MANAGEMENT CONTROLLER ('BMC') IN A COMPUTING SYSTEM

CROSS-REFERENCE TO RELATED APPLICATION

This application is a continuation application of and claims priority from U.S. patent application Ser. No. 13/665,132, filed on Oct. 31, 2012.

BACKGROUND OF THE INVENTION

1. Field of the Invention

The field of the invention is data processing, or, more specifically, methods, apparatus, and products for transferring files to a baseboard management controller ('BMC') in a computing system.

2. Description of Related Art

Modern servers utilize a baseboard management controller ('BMC') to perform the update of various firmware components. The update data that contains the information that is used when performing such updates can be extremely large in size. Because of the size of the update data and the slow speed of traditional interfaces used to transmit data to the BMC, the process of updating various system components can be time intensive.

SUMMARY OF THE INVENTION

Methods and computing systems for transferring files to a baseboard management controller ('BMC') in a computing system, including: receiving, by the BMC, a request to initiate an update of the computing system; identifying, by the BMC, an area in memory within the computing system for storing an update file; and transmitting, by the BMC, a request to register the BMC as a virtual memory device.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
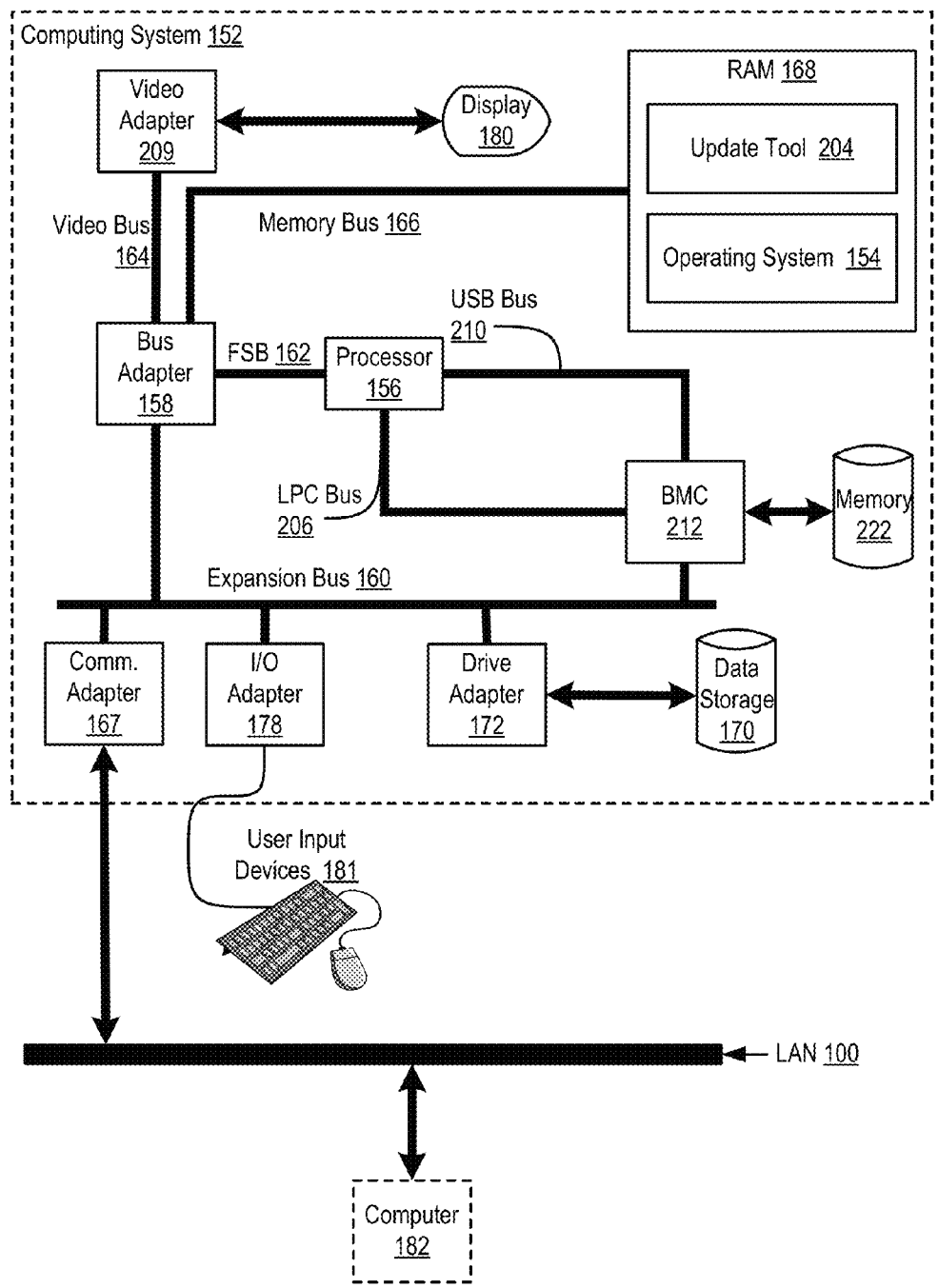
FIG. 1 sets forth a block diagram of automated computing machinery comprising an example computing system useful in transferring files to a BMC according to embodiments of the present invention.

Example methods, apparatus, and products for transferring files to a baseboard management controller ('BMC') in a computing system in accordance with the present invention are described with reference to the accompanying drawings, beginning with FIG. 1. FIG. 1 sets forth a block diagram of automated computing machinery comprising an example computing system (152) useful in transferring files to a BMC (212) according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an update tool (204). The update tool (204) of FIG. 1 may be embodied, for example, as a module of computer program instructions for updating various components of the computing system (152). For example, the update tool (204) may be a module of computer program instructions for periodically updating firmware within the computing system (152). Such updates may be carried out by the BMC (212) upon receipt of one or more update files that are transferred from the update tool (204) to the BMC (212) during execution of the update tool (204).

Also stored in RAM (168) is an operating system (154). Operating systems useful transferring files to a BMC (212) according to embodiments of the present invention according to embodiments of the present invention include UNIX™, Linux™, Microsoft XP™, AIX™, IBM's i5/OS™, and others as will occur to those of skill in the art. The operating system (154) and update tool (204) in the example of FIG. 1 are shown in RAM (168), but many components of such software typically are stored in non-volatile memory also, such as, for example, on a disk drive (170).

The computing system (152) of FIG. 1 also includes a BMC (212). The BMC (212) of FIG. 1 is a microcontroller that may be embedded on a motherboard of a computer, such as a server. A BMC is often referred to as the intelligence in the Intelligent Platform Management Interface ('IPMI') architecture. IPMI is a specification that defines a set of common interfaces to a computing system (152) that system administrators can use to monitor system health and manage the computing system (152). An IPMI sub-system operates independently of the operating system (154) and allows administrators to manage the computing system (152) remotely even in the absence of an operating system (154) or in the absence of system management software.

The processor (156) that executes the update tool (204) can be coupled to the BMC (212) by one or more data communications busses. In the example of FIG. 1, the processor (156) that executes the update tool (204) is coupled to the BMC (212) via a low pin count ('LPC') bus (206). The LPC bus (206) of FIG. 1 is a relatively low bandwidth data communications bus. The LPC Bus (206) may be used to implement the IPMI Keyboard Controller Style ('KCS') interface that is used to issue requests and gather responses. The update tool (204) can be configured to utilize the IPMI KCS interface for periodically updating firmware within the computing system (152). The computing system (152) of FIG. 1 also includes computer memory (222). The computer memory (222) may be embodied, for example, as non-volatile computer memory that is accessible by the BMC (212).

The BMC (212) of FIG. 1 may be configured to transfer files to the BMC (212) by receiving a request to initiate an update of the computing system (152). The request to initiate an update of the computing system (152) may be received by the BMC (212) via the LPC bus (206). In such an example, the request can be initiated by the update tool (204). The update tool (204) may initiate the request to update the computing system (152), for example, upon the receipt of a new update from an update service, upon the expiration of some amount of time specified in an update schedule, and so on. The request to initiate an update of the computing system (152) may include additional information identifying, for example, the size of the update file, the components within the computing system (152) that are to be updated, a preferred time to begin the update, and other information that may be of use to the BMC (212) for the purposes of applying an update to the computing system (212).

The BMC (212) of FIG. 1 may further be configured to transfer files to the BMC (212) by identifying an area in memory (222) within the computing system (152) for storing an update file. The update file may include information needed by the BMC (212) to perform some update on the computing system (152). The update file may include, for example, information identifying a particular device, memory location, or file to update. The update file may also include the actual data to be used when performing an update. For example, if a particular file in firmware is to be updated, the update file may include a newer version of the file that is to replace the particular file in firmware that is to be updated. As described above, the request to initiate an update of the computing system (152) can include information identifying the size of the update file that is to be used by the BMC (212) to perform some system update. In such an example, the BMC (212) can therefore determine the amount of memory (222) that is needed to store the update file.

Identifying an area in memory (222) within the computing system (152) for storing an update file may be carried out by dynamically requesting the allocation of memory (222) that is accessible by the BMC (212), so that the BMC (212) can store the update file in the area of memory (222) that is allocated to the BMC (212). Alternatively, the BMC (212) may have some memory (222) in the computing system (152) that is available for exclusive use by the BMC (212). In such an example, identifying an area in memory (222) within the computing system (152) for storing an update file may be carried out by the BMC (212) identifying an area of free memory in the memory (222) that is available for exclusive use by the BMC (212) that is sufficient in size for storing the update file.

The BMC (212) of FIG. 1 may further be configured to transfer files to the BMC (212) by transmitting a request to register the BMC (212) as a virtual memory device. A virtual memory drive is a logical representation of actual computer memory (222) within the computing system (152). Through the use of memory virtualization, the various forms of computer data storage in the computing system (152) may be viewed by programs executing on the computing system (152) as though there is only one kind of memory—virtual memory—which behaves like directly addressable read/write memory. The virtual memory drive may therefore appear to the update tool (204) as memory that is directly accessible by the update tool (204) over a memory bus. For example, the virtual memory device may appear to the update tool (204) as a Universal Serial Bus ('USB') memory device that is accessible to the update tool (204) over a USB bus (210).

Transmitting a request to register the BMC (212) as a virtual memory device may be carried out, for example, through the use of USB core that is included in the BMC (212). In such an example, transmitting a request to register the BMC (212) as a virtual memory device may be carried out by the BMC (212) generating a USB reset signal and presenting itself to the computing system (152) as a virtual USB key of sufficient size to receive the pending update file. In such an example, the operating system (154) may subsequently mount the virtual USB key as a virtual memory drive that is attached to the computing system (152). In such a way, the BMC (212) may appear to the update tool (204) as a virtual USB memory device that is accessible over the USB bus (210) that couples the processor (156) to the BMC (212). As such, the update tool (204) can affect the transfer of an update file to the BMC (212) by simply writing the update file to the virtual memory device. Because the rate at which data is transferred over the USB bus (210) is faster than the rate at which data is transferred over the LPC bus (206), an update file may be transferred from the update tool (204) to the BMC (212) more rapidly than would occur if the update tool (204) transferred the update file to the BMC (212) over the LPC bus (206).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of disk drive (170). Disk drive adapters useful in computing systems configured for transferring files to a BMC according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computing system (152) of FIG. 1 includes a communications adapter (167) for data communications with other computers (182) and for data communications with a data communications network (100). Such data communications may be carried out serially through RS-232 connections, through external buses such as a USB, through data communications networks such as IP data communications networks, and in other ways as will occur to those of skill in the art. Communications adapters implement the hardware level of data communications through which one computer sends data communications to another computer, directly or through a data communications network. Examples of communications adapters useful for computing systems configured for transferring files to a BMC according to embodiments of the present invention include modems for wired dial-up communications, Ethernet (IEEE 802.3) adapters for wired data communications network communications, and 802.11 adapters for wireless data communications network communications.

Figure 2:
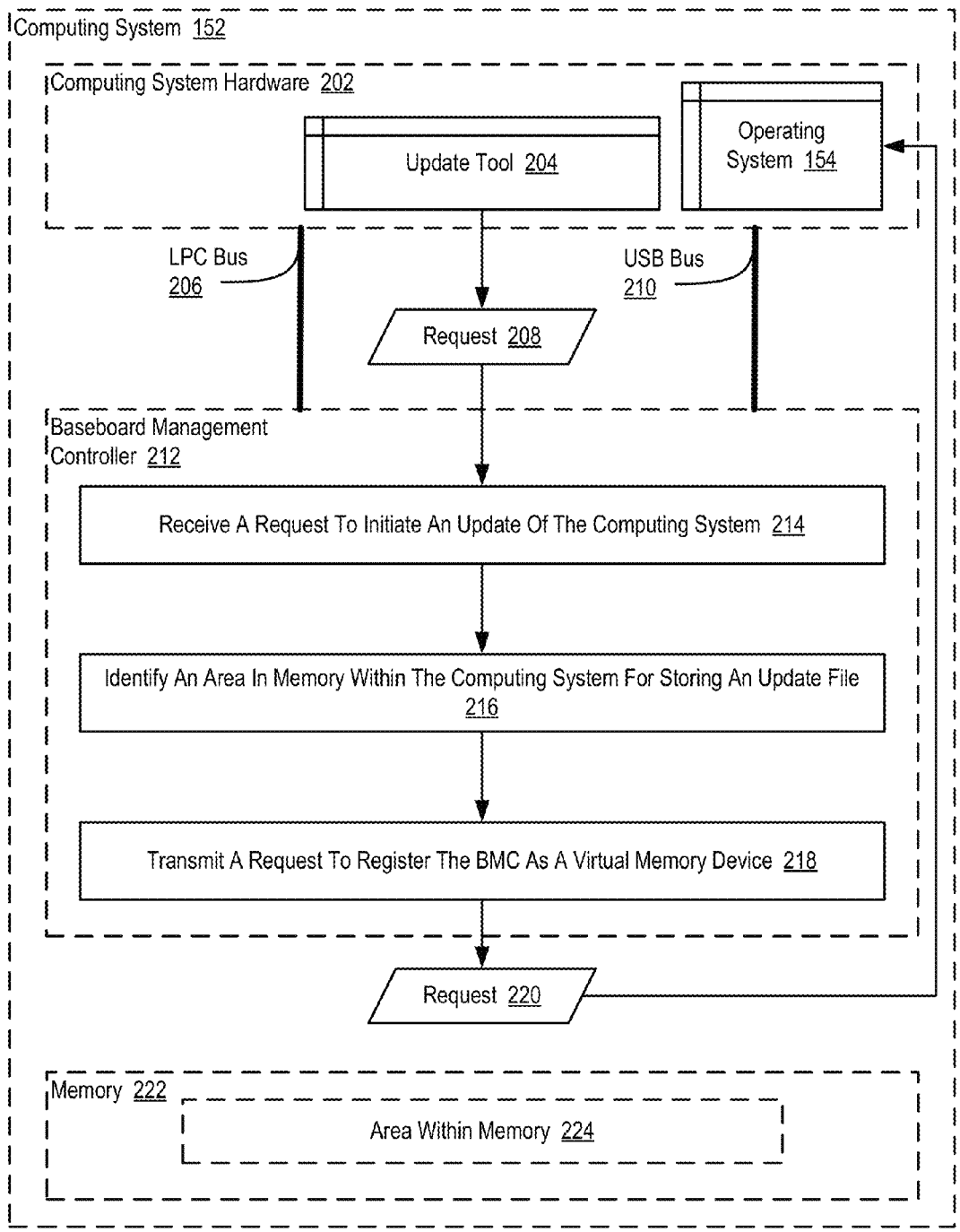
FIG. 2 sets forth a flow chart illustrating an example method for transferring files to a BMC in a computing system according to embodiments of the present invention.

For further explanation, FIG. 2 sets forth a flow chart illustrating an example method for transferring files to a BMC (212) in a computing system (152) according to embodiments of the present invention. The computing system (152) of FIG. 2 includes computing system hardware (202), such as a computer processor, which is executing an update tool (204). The update tool (204) of FIG. 2 may be embodied, for example, as a module of computer program instructions for updating various components of the computing system (152). For example, the update tool (204) may be a module of computer program instructions for periodically updating firmware within the computing system (152). Such updates may be carried out by the BMC (212) upon receipt of one or more update files that are transferred from the computing system hardware (202) to the BMC (212) during execution of the update tool (204).

The computing system hardware (202) that executes the update tool (204) can be coupled to the BMC (212) by one or more data communications busses. In the example of FIG. 2, the computing system hardware (202) that executes the update tool (204) is coupled to the BMC (212) via a low pin count ('LPC') bus (206). The LPC bus (206) of FIG. 2 is a relatively low bandwidth data communications bus. The LPC bus (206) of FIG. 2 may be used to implement an IPMI, which is a standardized system interface used by administrators to manage a computer system and to monitor its operation. In particular, the LPC Bus (206) may be used to implement the IPMI KCS interface that is used to issue requests and gather responses. In the example method of FIG. 2, the update tool (204) can be configured to utilize the IPMI KCS interface for periodically updating firmware within the computing system (152). The computing system (152) of FIG. 2 also includes computer memory (222). The computer memory (222) may be embodied, for example, as non-volatile computer memory that is accessible by the BMC (212).

The example method of FIG. 2 includes receiving (214), by the BMC (212), a request (208) to initiate an update of the computing system (152). In the example method of FIG. 2, the request (208) to initiate an update of the computing system (152) may be received by the BMC (212) via the LPC bus (206). In such an example, the request (208) can be initiated by the update tool (204). The update tool (204) may initiate the request (208) to initiate an update of the computing system (152), for example, upon the receipt of a new update from an update service, upon the expiration of some amount of time specified in an update schedule, and so on. The request (208) to initiate an update of the computing system (152) may include additional information identifying, for example, the size of the update file, the components within the computing system (152) that are to be updated, a preferred time to begin the update, and other information that may be of use to the BMC (212) for the purposes of applying an update to the computing system (212).

The example method of FIG. 2 also includes identifying (216), by the BMC (212), an area (224) in memory (222) within the computing system (152) for storing an update file. In the example method of FIG. 2, the update file may include information needed by the BMC (212) to perform some update on the computing system (152). The update file may include, for example, information identifying a particular device, memory location, or file to update. The update file may also include the actual data to be used when performing an update. For example, if a particular file in firmware is to be updated, the update file may include a newer version of the file that is to replace the particular file in firmware that is to be updated. As described above, the request (208) to initiate an update of the computing system (152) can include information identifying the size of the update file that is to be used by the BMC (212) to perform some system update. In such an example, the BMC (212) can therefore determine the amount of memory (222) that is needed to store the update file.

In the example method of FIG. 2, identifying (216) an area (224) in memory (222) within the computing system (152) for storing an update file may be carried out by dynamically requesting the allocation of memory (222) that is accessible by the BMC (212), so that the BMC (212) can store the update file in area (224) with the memory (222) that is allocated to the BMC (212). Alternatively, the BMC (212) may have some memory (222) in the computing system (152) that is available for exclusive use by the BMC (212). In such an example, identifying (216) an area (224) in memory (222) within the computing system (152) for storing an update file may be carried out by the BMC (212) identifying an area (222) within such memory (222) that is sufficient in size for storing the update file.

The example method of FIG. 2 also includes transmitting (218), by the BMC (212), a request (220) to register the BMC (212) as a virtual memory device. In the example method of FIG. 2, the virtual memory drive is a logical representation of actual computer memory (222) within the computing system (152). Through the use of memory virtualization, the various forms of computer data storage in the computing system (152) may be viewed by programs executing on the computing system (152) as though there is only one kind of memory—virtual memory—which behaves like directly addressable read/write memory. In the example method of FIG. 2, the virtual memory drive may therefore appear to the update tool (204) as memory that is directly accessible by the update tool (204) over a memory bus. For example, the virtual memory device may appear to the update tool (204) as a USB memory device that is accessible to the update tool (204) over a USB bus (210).

In the example method of FIG. 2, transmitting (218) a request (220) to register the BMC (212) as a virtual memory device may be carried out, for example, through the use of USB core that is included in the BMC (212). In such an example, transmitting (218) a request (220) to register the BMC (212) as a virtual memory device may be carried out by the BMC (212) generating a USB reset and presenting itself to the computing system (152) a virtual USB key of sufficient size to receive the pending update file. In such an example, the operating system (154) may subsequently mount the virtual USB key as a virtual memory drive that is attached to the computing system (152). In such a way, the BMC (212) may appear to the update tool (204) as a virtual USB memory device that is accessible over the USB bus (210) that couples the computing system hardware (202) to the BMC (212). As such, the update tool (204) can affect the transfer of an update file to the BMC (212) by simply writing the update file to the virtual memory device. Because the rate at which data is transferred over the USB bus (210) is faster than the rate at which data is transferred over the LPC bus (206), an update file may be transferred from the update tool (204) to the BMC (212) more rapidly than would occur if the update tool (204) transferred the update file to the BMC (212) over the LPC bus (206).

Figure 3:
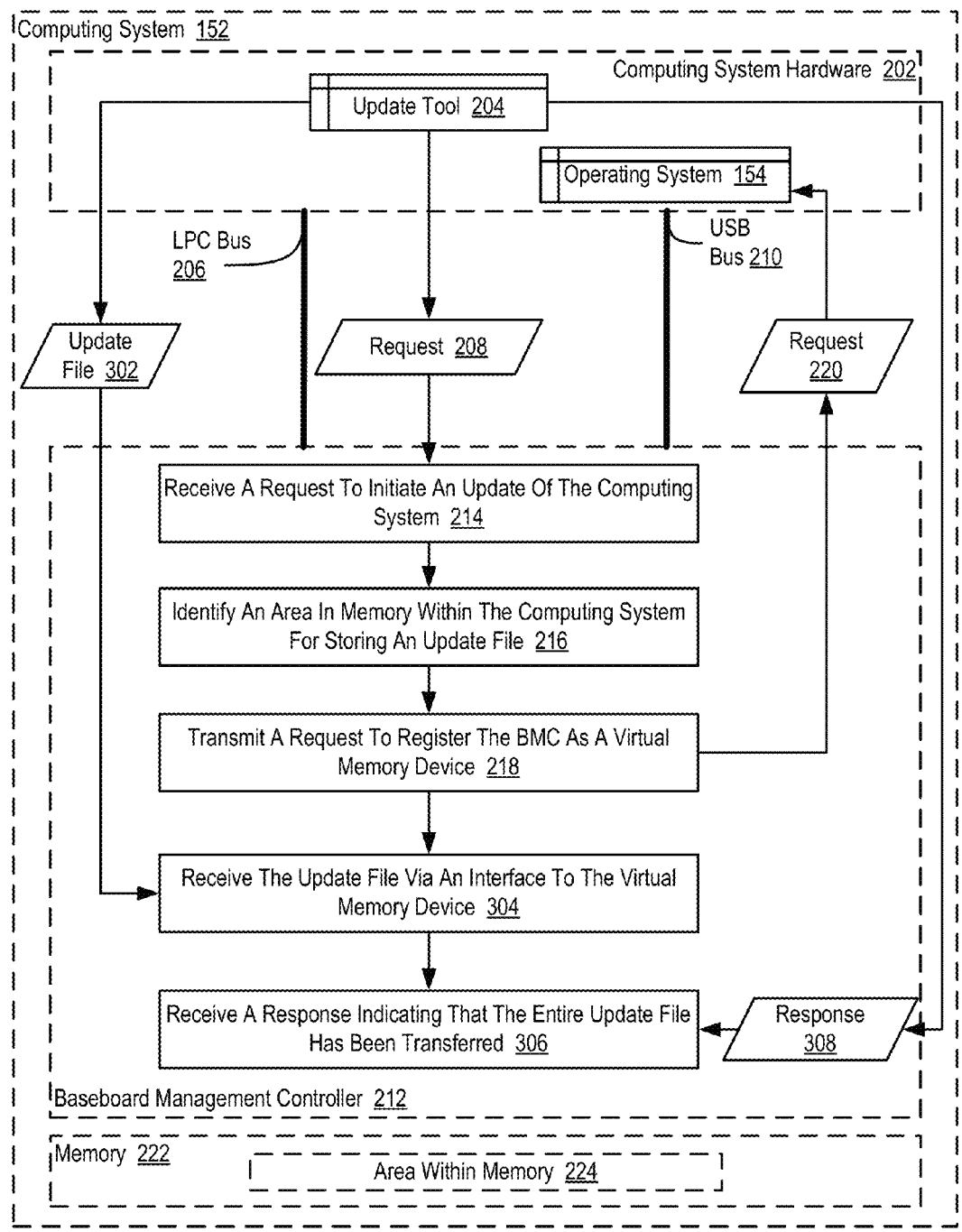
FIG. 3 sets forth a further flow chart illustrating an example method for transferring files to a BMC in a computing system according to embodiments of the present invention.

For further explanation, FIG. 3 sets forth a flow chart illustrating a further example method for transferring files to a BMC (212) in a computing system (152) according to embodiments of the present invention. The example method of FIG. 3 is similar to the method of FIG. 2 as it also includes receiving (214) a request (208) to initiate an update of the computing system (152), identifying (216) an area (224) in memory (222) within the computing system (152) for storing an update file, and transmitting (218) a request (220) to register the BMC (212) as a virtual memory device.

The example method of FIG. 3 also includes receiving (304), by the BMC (212), the update file (302) via an interface to the virtual memory device. In the example method of FIG. 3, the update file (302) can include information needed by the BMC (212) to perform some update on the computing system (152). The update file may include, for example, information identifying a particular device, memory location, or file to update. The update file may also include the actual data to be used when performing an update. For example, if a particular file in firmware is to be updated, the update file may include a newer version of the file that is to replace the particular file in firmware that is to be updated.

In the example method of FIG. 3, the BMC (212) may receive the update file (302) via an interface to the virtual memory device such as the USB bus (210). In the example method of FIG. 3, the update tool (204) views the BMC (212) as a virtual memory drive, as the result of the BMC (212) being registered as a virtual memory drive that is accessible to applications executing on the computing system hardware (202). The update tool (204) may therefore be configured to transfer the update file (302) to such a virtual memory drive. Although the update tool (204) believes that it is transferring the update file to a virtual memory drive, the update tool (204) is actually transferring the update file (302) to the BMC (212) such that the BMC (212) receives the update file (302) via an interface to the virtual memory device.

The example method of FIG. 3 also includes receiving (306), by the BMC (212), a response (308) indicating that the entire update file (302) has been transferred. In the example method of FIG. 3, the response (308) indicating that the entire update file (302) has been transferred may be embodied, for example, as an IPMI command that is transmitted from the update tool (204) to the BMC (212) via the LPC bus (206). The IPMI command represents a control message indicating, to the BMC (212), that all update information that the BMC (212) needs to perform a system update has been provided by the update tool (204).

Figure 4:
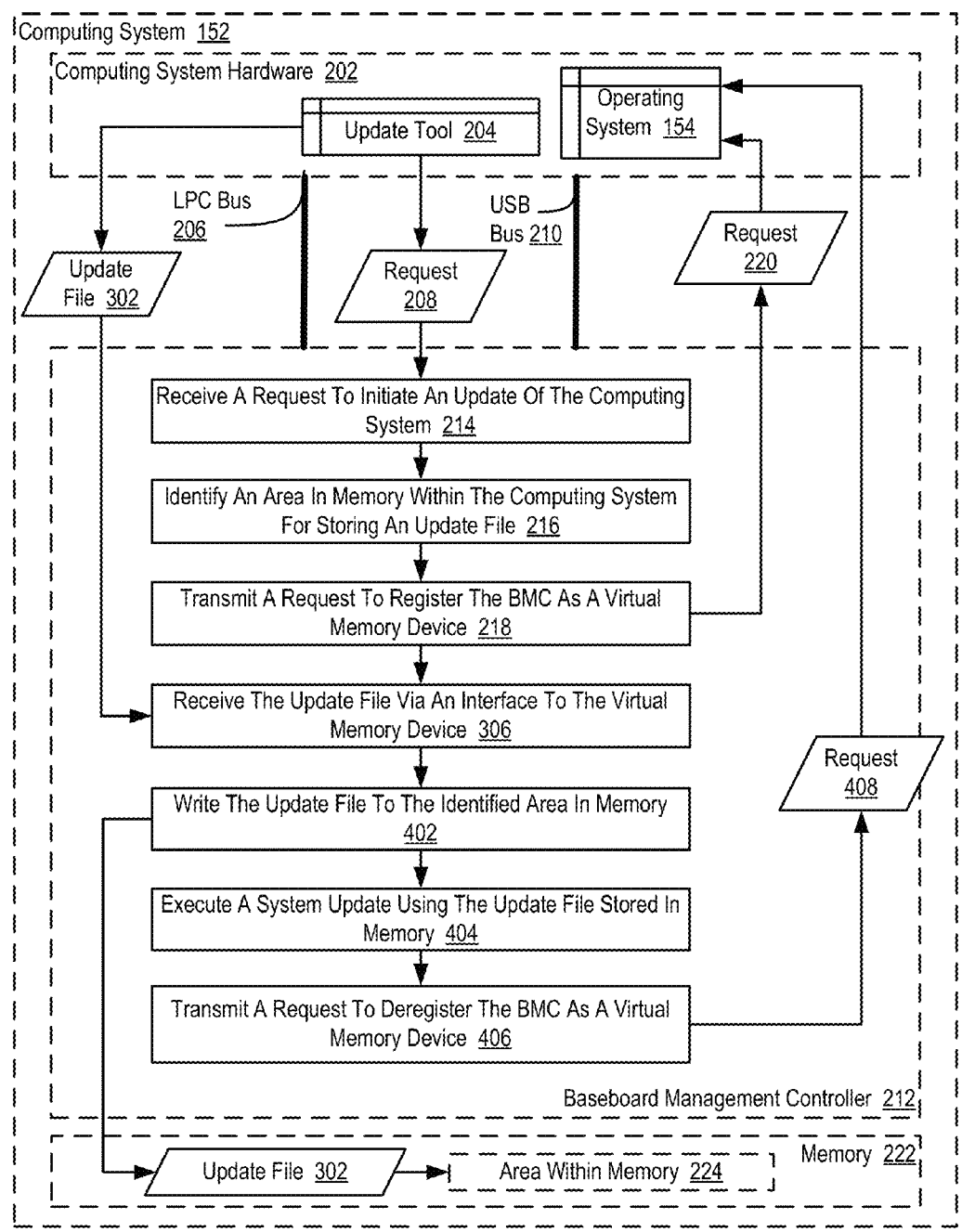
FIG. 4 sets forth a further flow chart illustrating an example method for transferring files to a BMC in a computing system according to embodiments of the present invention.

For further explanation, FIG. 4 sets forth a flow chart illustrating a further example method for transferring files to a BMC (212) in a computing system (152) according to embodiments of the present invention. The example method of FIG. 4 is similar to the method of FIG. 3 as it also includes receiving (214) a request (208) to initiate an update of the computing system (152), identifying (216) an area (224) in memory (222) within the computing system (152) for storing an update file, transmitting (218) a request (220) to register the BMC (212) as a virtual memory device, and receiving (304) the update file (302) via an interface to the virtual memory device.

The example method of FIG. 4 also includes writing (402), by the BMC (212), the update file (302) to the identified area (224) in memory (222). In the example method of FIG. 4, the BMC (212) is coupled to memory (222) in the computing system (152) that is available for use by the BMC (212). As such, upon receipt of the update file (302) from the update tool (204), the BMC (212) may write the update file (302) to the identified area (224) in memory (222) over a memory bus that couples the BMC (212) to memory (222). The update file (302) is subsequently available for use by the BMC (212) when performing an update.

The example method of FIG. 4 also includes executing (404), by the BMC (212), a system update using the update file (302) stored in the identified area (224) in memory (222). In the example method of FIG. 4, the system update may include modifying firmware within the computing system (212). In the example method of FIG. 4, the computing system (152) is updated using information contained in the update file (302). Such information can include an identifier for a device to be updated, data to be used in the update, and so on. Upon completion of the system update, the BMC (212) may free the area (224) in memory that contained the update file (302).

The example method of FIG. 4 also includes transmitting (406), by the BMC (212), a request (408) to deregister the BMC (212) as a virtual memory device. In the example method of FIG. 4, transmitting (406) a request (408) to deregister the BMC (212) as a virtual memory device may be carried out, for example, by generating a USB reset and removing the virtual USB key from the computing system (152). In such a way, the virtual drive that the BMC (212) presented to other components in the computing system (212) will be removed and the virtual drive will no longer be available to the other components in the computing system (212). In the example method of FIG. 4, transmitting (406) a request (408) to deregister the BMC (212) as a virtual memory device may occur any time after the point in time at which the update file (302) was received from the update tool (204).

Example embodiments of the present invention are described largely in the context of a fully functional computer system for transferring files to a BMC in a computing system. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of transferring files to a baseboard management controller ('BMC') in a computing system, the method comprising:
    receiving, by the BMC via a first data communications bus, a request to initiate an update of the computing system;
    identifying, by the BMC, an area in computer memory within the computing system for storing an update file; and
    transmitting, by the BMC to an operating system of the computing system via a second data communications bus, a request to register the BMC as a virtual memory device, wherein the virtual memory device is accessible to the operating system and applications executed by the computing system;
    receiving, by the BMC responsive to a write operation to the virtual memory device via the second data communications bus, the update file via an interface to the virtual memory device; and
    writing, by the BMC, the update file to the identified area in computer memory.

2. The method of claim 1 wherein the second data communications bus comprises a Universal Serial Bus ('USB').

3. The method of claim 1 further comprising receiving, by the BMC, a response indicating that the entire update file has been transferred.

4. The method of claim 1 further comprising executing, by the BMC, a system update using the update file stored in the identified area in memory.

5. The method of claim 1 further comprising transmitting, by the BMC, a request to deregister the BMC as a virtual memory device.

* * * * *